(12) United States Patent
Mishra et al.

(10) Patent No.: US 12,557,181 B2
(45) Date of Patent: *Feb. 17, 2026

(54) 5G ENHANCED HETNET GATEWAY

(71) Applicant: Parallel Wireless, Inc., Nashua, NH (US)

(72) Inventors: Rajesh Kumar Mishra, Westford, MA (US); Eugina Jordan, Leominster, MA (US); Zahid Ghadialy, Ilford (GB)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,446

(22) Filed: Mar. 5, 2024

(65) Prior Publication Data

US 2024/0298383 A1 Sep. 5, 2024

Related U.S. Application Data

(63) Continuation of application No. 16/940,385, filed on Jul. 27, 2020, now Pat. No. 11,924,925.

(60) Provisional application No. 62/879,200, filed on Jul. 26, 2019.

(51) Int. Cl.
| | |
|---|---|
| *H04W 88/16* | (2009.01) |
| *H04L 12/46* | (2006.01) |
| *H04W 84/04* | (2009.01) |

(52) U.S. Cl.
CPC ......... *H04W 88/16* (2013.01); *H04L 12/4641* (2013.01); *H04W 84/045* (2013.01)

(58) Field of Classification Search
CPC .. H04W 88/16; H04W 84/045; H04L 12/4641
See application file for complete search history.

(56) References Cited

U.S. PATENT DOCUMENTS

| | | | | |
|---|---|---|---|---|
| 6,363,255 | B1* | 3/2002 | Kuwahara | H04W 68/04 |
| | | | | 455/458 |
| 10,085,199 | B1* | 9/2018 | Shaw | H04W 16/08 |
| 10,367,677 | B2* | 7/2019 | Parkvall | H04J 11/0059 |
| 10,630,410 | B2* | 4/2020 | Parkvall | H04L 5/1469 |
| 2015/0358248 | A1* | 12/2015 | Saha | H04L 41/40 |
| | | | | 709/226 |
| 2016/0157084 | A1* | 6/2016 | Tsubouchi | H04W 8/12 |
| | | | | 455/432.1 |
| 2017/0345281 | A1* | 11/2017 | Shaw | H04L 41/0816 |
| 2018/0242198 | A1* | 8/2018 | Choi | H04L 67/51 |
| 2018/0316779 | A1* | 11/2018 | Dowlatkhah | H04W 24/02 |
| 2019/0174320 | A1* | 6/2019 | Kodaypak | H04L 41/00 |
| 2019/0174347 | A1* | 6/2019 | Dowlatkhah | H04W 8/18 |
| 2019/0238425 | A1* | 8/2019 | Mladin | H04L 41/5048 |
| 2019/0280938 | A1* | 9/2019 | Chou | H04L 41/082 |

(Continued)

FOREIGN PATENT DOCUMENTS

WO WO-2019033901 A1 * 2/2019 ........ H04W 36/0033

*Primary Examiner* — Kenny S Lin
(74) *Attorney, Agent, or Firm* — Michael Y. Saji, Reg. No. 66291

(57) ABSTRACT

A 5G enhanced HetNet Gateway (HNG) is presented. In one embodiment the 5G HNG includes at least one non-5G virtual network function (VNF); a 5G Core (5GC) option selection VNF; a 5GC default VNF; a 5G local breakout VNF; at least one interface for any G base station; and at least one interface for any core network. Core functionality is abstracted for the EPC and for the 5GC.

14 Claims, 13 Drawing Sheets

(56) References Cited

U.S. PATENT DOCUMENTS

| | | | | |
|---|---|---|---|---|
| 2019/0364616 A1* | 11/2019 | Mishra | ............... | H04W 88/16 |
| 2020/0195521 A1* | 6/2020 | Bogineni | ............... | H04W 36/26 |
| 2020/0267623 A1* | 8/2020 | Altay | ............... | H04L 45/64 |
| 2020/0295970 A1* | 9/2020 | Gurbani | ............... | G06N 20/00 |
| 2021/0194730 A1* | 6/2021 | Kim | ............... | H04L 12/4641 |
| 2021/0274472 A1* | 9/2021 | Foti | ............... | H04W 72/02 |

* cited by examiner

5G ENHANCED HETNET GATEWAY

CROSS-REFERENCE TO RELATED APPLICATIONS

This application is a continuation of U.S. application Ser. No. 16/940,385, filed Jul. 27, 2020, which claims priority under 35 U.S.C. § 119(e) to U.S. Provisional Pat. App. No. 62/879,200, filed Jul. 26, 2019, titled "5G Enhanced HetNet Gateway," each of which is hereby incorporated by reference in its entirety for all purposes. This application hereby incorporates by reference U.S. Provisional Pat. App. No. 62/945,876, filed Dec. 9, 2019, titled "5G Open RAN Controller"; U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND 5G is the next generation Mobile Communication technology following the 4G/LTE. 3GPP has been working on defining the standards for 5G as part of 3GPP Rel 15 and 16. Starting 1G and then followed by 2G, 3G and 4G, each generation has the laid the foundation for the next generation in order to cater to newer use cases and verticals. 4G was the first generation that introduced flat architecture with all-IP architecture. 4G enabled and flourished several new applications and use case. 5G is going to be not just about higher data rates but about total user experience and is going to cater to several new enterprise use cases like Industrial automation, Connected Cars, Massive IOT and others. This will help operators to go after new revenue opportunities.

Launching 5G network will need significant investment as it will need RAN and Packet Core upgrade. 3GPP has defined a new 5G NR and new 5G Core. Eventually all the operators will want to head towards a complete 5G network coverage with the new 5G Standalone Core, given the several new features and capabilities that the new 5G Standalone network brings in. But given the significant cost involved, 3GPP has defined number of different intermediate solutions that can provide gradual migration from current 4G network to the eventual native 5G network.

SUMMARY

Currently, the standards for 5G are being finalized. 5G, the 3GPP version of ITU IMT-2020 is the main and only contender for the next generation of mobile technology. What is obvious to everyone is that 5G will be a natural evolution from 4G and will drive the ecosystem innovation to deliver enhanced customer experience while extending 4G network investments.

Parallel Wireless HetNet Gateway (HNG) enables a 5G ready architecture which is available to be deployed today. Enhancements to the HNG will allow a Non-standalone (NSA) deployment with LTE and 5G NR connected to EPC. With the availability of 5G Core (5GC), HNG will enable different 5G deployment options seamlessly, thereby reducing the complexity, Capex & Opex, from the operator.

A wireless network system is described. In one embodiment the system includes at least one of a Non-Stand-Alone (NSA) base station and a Stand-Alone (SA) base station and a 5G enhanced HetNet Gateway (HNG) in communication with at least one of the NSA base station and the SA base station, the 5G enhanced HNG including interfaces for any G base station and interfaces for any core network. The system further includes a core network in communication with the 5G enhanced HNG, the core network including at least one of an Evolved Packet Core (EPC) and a 5G Core (5GC) and wherein the 5G enhanced HNG abstracts core functionality for EPC and for the 5GC, thereby providing distributed core functionality.

DETAILED DESCRIPTION

Figure 1:
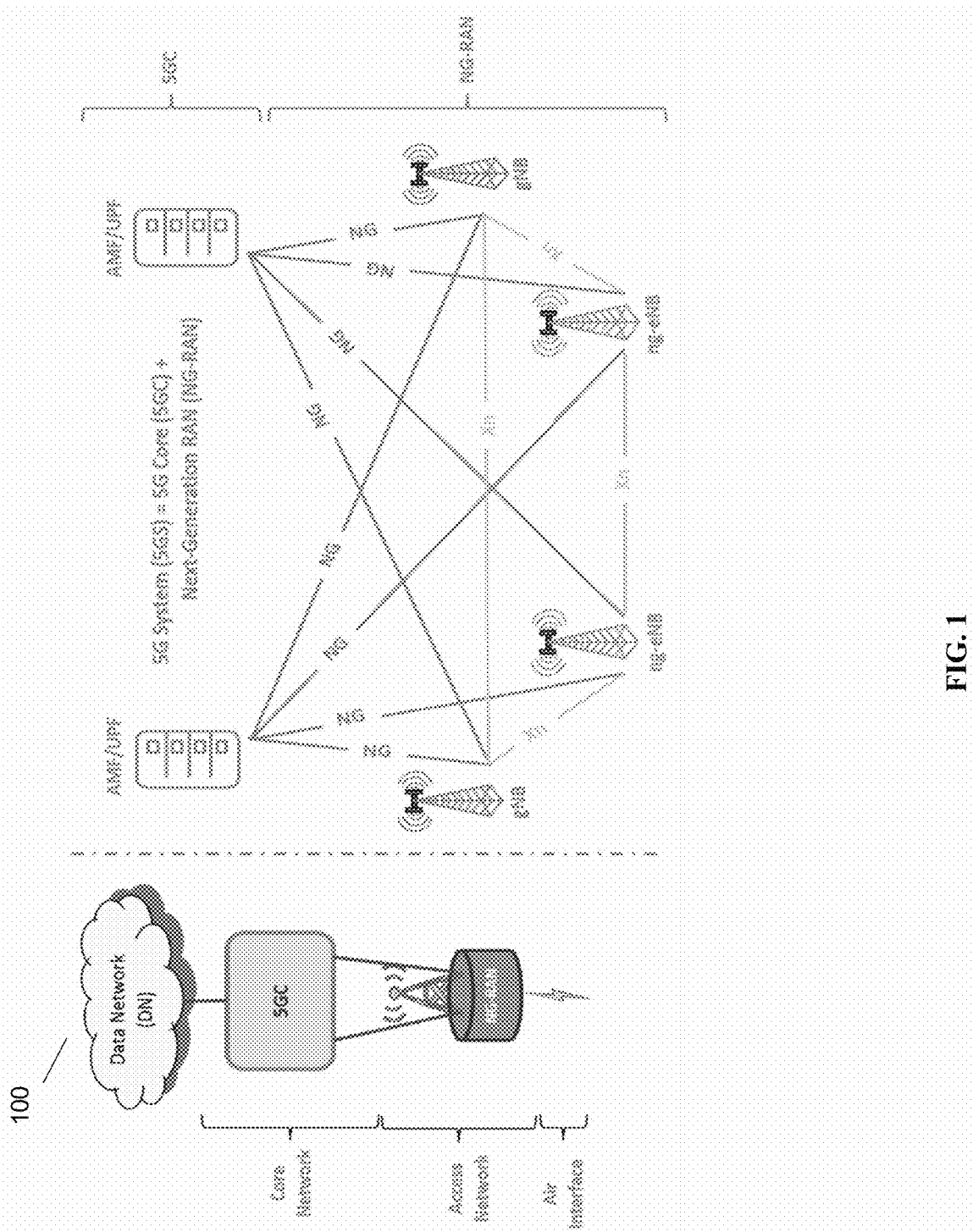
FIG. 1 is a diagram showing a 5G system, in accordance with some embodiments.

As the future of 5G is still being defined, there is much uncertainty around what 5G will actually be once it comes to fruition. If the main goal of 5G is to improve people's lives, the development of 5G should consider the various use cases for 5G. Additionally, 5G networks should seek to address the challenges faced by current 2G, 3G, 4G network architectures.

Varying network maturity in different regions requires a solution that can address older (2G, 3G, 4G) generation technologies while managing future (5G) networks—what will work for the more advanced market likely won't be a good option for less developed markets. One example of this is the Indian market, which still largely uses 3G networks and is still making investments into 4G. If 5G is set to be another air interface introduced within the next five years, does this mean that networks in India and other countries with older generation networks will have to simply skip over 4G? Another example of this is in Western European markets where 4G LTE investments are projected to increase dramatically over the next few years.

The defining challenge of the next ten years will be to efficiently deploy and manage networks that are becoming more complex in order to address the challenges of increasing data usage and higher density. The issue with managing these networks is that they comprise of several different technologies and air interfaces.

5G will embrace a true HetNet environment. This may range from multiple types of access technologies, multi-layer networks, to many different devices with billions of user interactions—and not just individual users. The new users will take advantage of 5G from municipalities to verticals like energy and health, from social organizations to public safety and defense.

5G will enable new services for all these users at low cost by providing seamless and efficient communication and will significantly improve the way people interact with each other, with the final goal of improving people's lives. To do so, the 5G network won't be limited to the radio access (RAN), but will encompass the whole network, including aspects as subscriber, policy and security management, core network and transport components.

5G networks will have to support a number of services, many of them with different and almost orthogonal performance requirements.

Three major service categories defined for 5G are: Enhanced Mobile Broadband (eMBB); Massive IoT or Machine Type Communications (mMTC); and Ultra-Reliable & Low Latency Communications (URLLC).

As per ongoing standards work underway, it is understood that to comply with the services and use case scenarios shown above, 5G comprises a complex set of technical requirements for all elements of a mobile network, not only in the RAN but also in the Core Network. It is expected that standards for all such scenarios will be completed by 2020.

However, in order to introduce some of the benefits earlier, delivery of functionality has been split into two phases.

Phase 1 with focus on eMBB, allowing MNOs to provide higher speeds and services like Fixed Wireless Access. Commercial deployments of this phase are expected by 2019

Phase 2 will add support for Massive IoT and URLLC scenarios.

In order to expedite network availability, phase 1 enables MNOs to launch services with new 5G radio (aka NR), with the ability to use either an existing 4G core, or a newly deployed 5G Core. The former is called Non-Standalone Mode (NSA), the latter Standalone Mode (SA).

5G System (5GS) and 5G Core (5GC)

The Next Generation Core Network (NGCN) or the 5G Core (5GC) standards are being specified by 3GPP and are expected to be ready by 2020 (Release-16). The term 5G has been broadened by 3GPP to mean the 'New Radio' (NR) and anything new in LTE (from 3GPP Release 15 onwards). Collectively they are referred to as Next-Generation RAN (NG-RAN). Collectively the 5GC and NG-RAN are known as the 5G System (5GS).

The justification for LTE being included as part of 5G is that the Non-Standalone (NSA) architecture that is being submitted to ITU for IMT-2020 includes the LTE network too. At this time, there is no guidance from 3GPP to suggest that someone deploying a Release 15-compliant LTE network cannot claim it to be a 5G network. Some operators like T-Mobile USA have already announced that they will deploy 5G in 600 MHz, which is already in use for LTE.

In order to expedite network availability, 5G phase 1 enables MNOs to launch services with new 5G radio (aka NR), with the ability to use either an existing 4G core, or a newly deployed 5G Core. The former is called Non-Standalone Mode (NSA), the latter Standalone Mode (SA). As a result, there will be potentially multiple core options in 5G: Standalone (SA), Non-standalone (NSA), LTE-assisted, NR-assisted, EPC-connected, NGCN connected.

These options are summarized in the system 100 of FIG. 1. As well, the division between the data network (DN), the core network (5GC), and the access network (NG-RAN), is shown. The 5GS (5G system) is the 5GC plus a next-generation RAN (NG-RAN). A 5GC is the 5G core network in a standalone modality. On the left, a 5G-only option is shown; on the right, an option that shows a 5GS in greater detail shows multiple core network nodes (two 5GCs, both with AMF and UPF functionality) and multiple base stations in two varieties, gNB and ng-eNB. The 5GC's communicate with both the gNB base stations and ng-eNBs using a next-generation (NG) interface. The base stations communicate with each other using the Xn interface, which is also a 5G interface.

Figure 2:
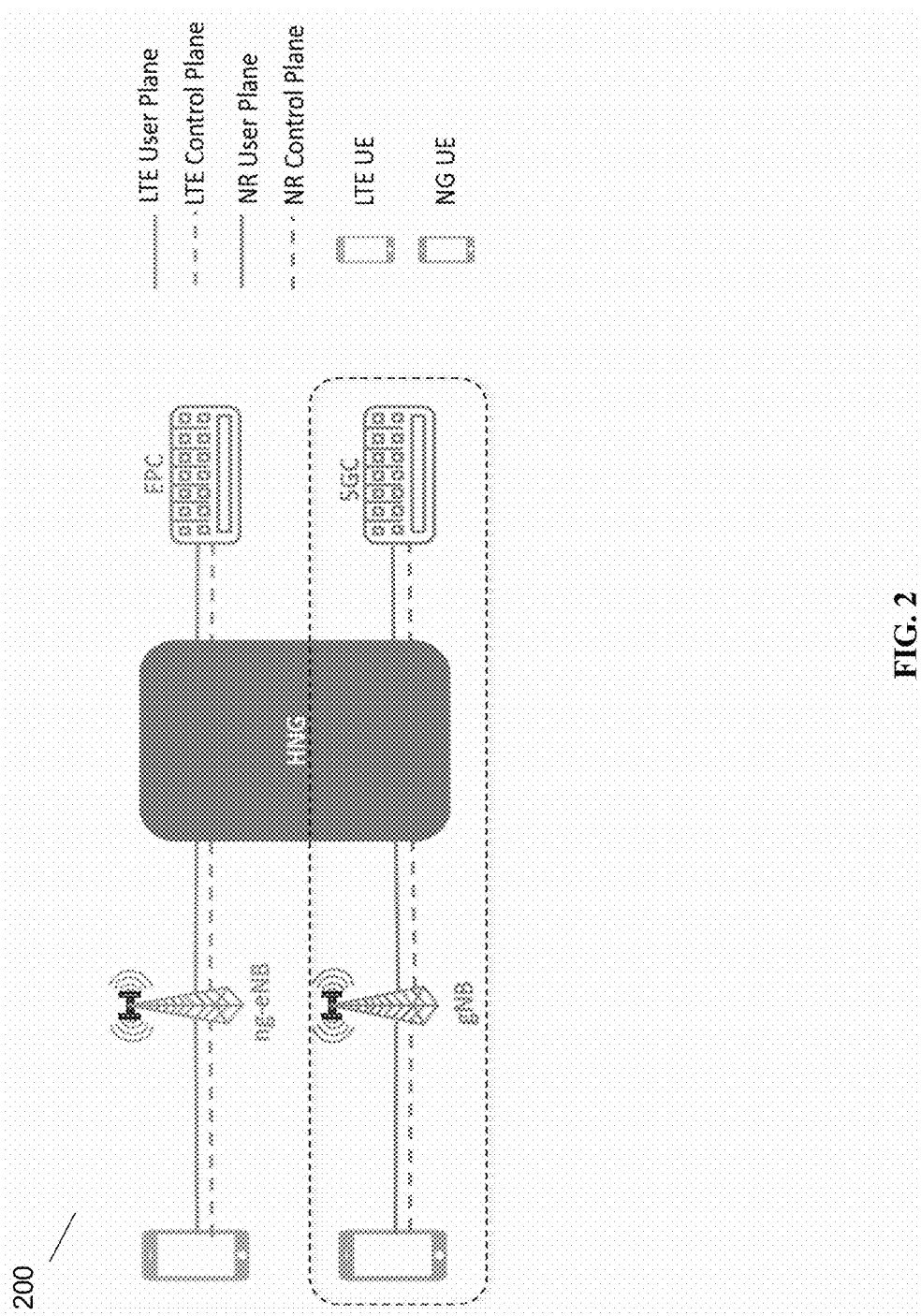
FIG. 2 is a diagram showing a 5G system including an HNG, in accordance with some embodiments.

FIG. 2 shows HetNet Gateway (HNG) 200 as 5G Core Enabler. Parallel Wireless HetNet Gateway (HNG) is flexible enough to support all possible 5G architecture options, allowing interworking with EPC & 5G CN when available.

The HNG manages all gNBs and ng-eNBs, even though they are on different RATs. In addition, HNG abstracts core functionality for EPC & NGCN thereby providing distributed core functionality (by virtualizing the core to the base station and interworking in some embodiments); this helps keep latency down which is a must for URLLC, and simplifies 5G deployment options for operators. As a result, HNG delivers investment protection.

Both 4G and 5G UEs are supported. Both 4GC (EPC) and 5GC are supported.

Figure 3:
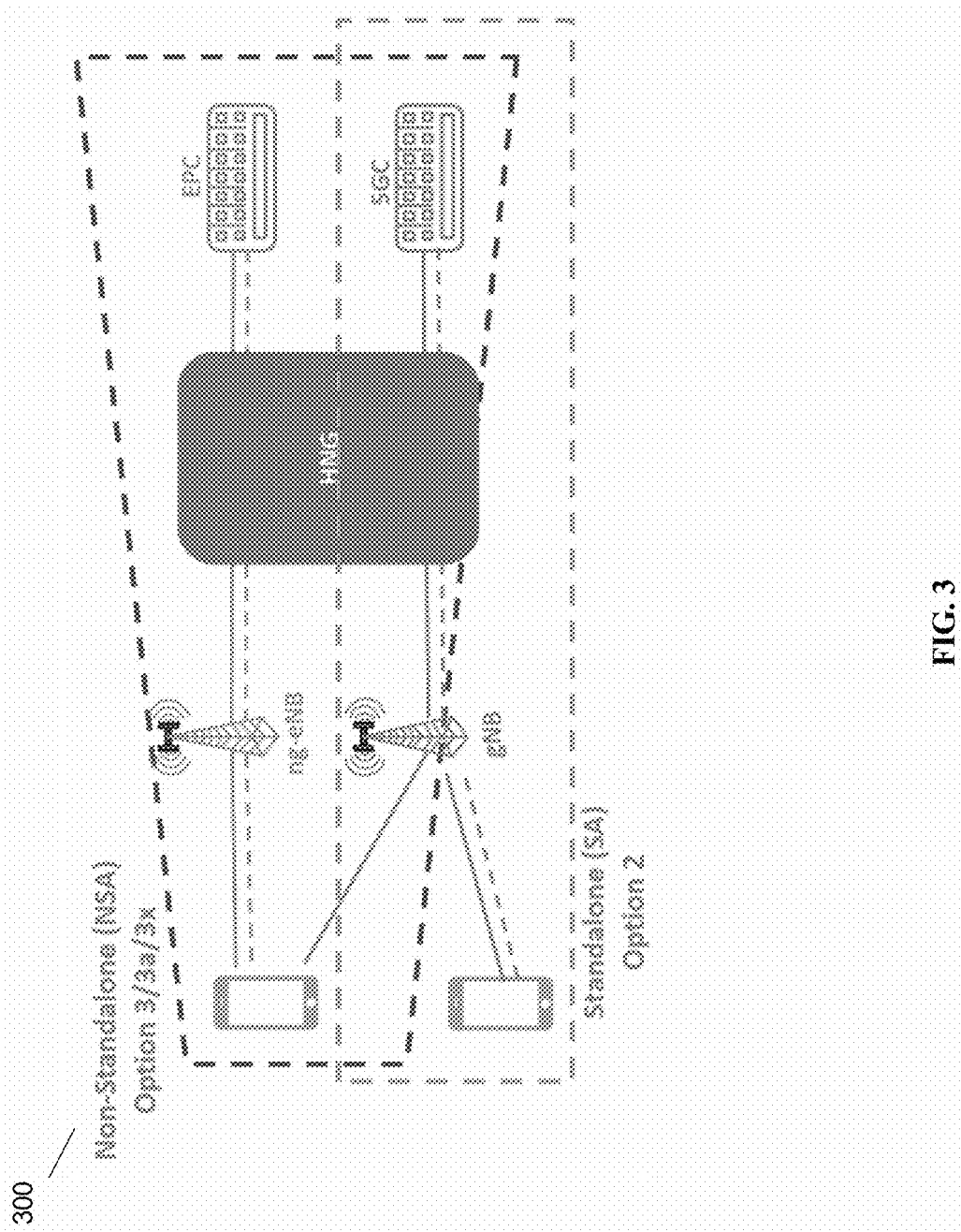
FIG. 3 is a diagram showing a 5G system including Non-Standalone (NSA) and Standalone (SA) options, in accordance with some embodiments.

As shown in FIG. 2 and also in system diagram 300 of FIG. 3, an HNG will seamlessly work with all deployment options for 5G allowing the service provider to gracefully migrate to 5G on the radio and core side. HNG will work with eNB and in the future with any gNB on the radio side, and on the core side with EPC and SA core (next generation core). There is no need to add any additional functionality, 5G readiness is built into the HNG software architecture.

Much of the fundamental architecture of 5G, especially when it comes to a key component called Network Slicing uses the Open NFV stack with two wrappers showing an orchestration function and a RAN management function.

This is what the Parallel Wireless HetNet Gateway does today. For the majority of the key attributes such as high reliability, multiple network core routing per use case, RAN sharing and RAN reuse, the Parallel Wireless solution can achieve these goals today and not only with 5G type radios. By having this done via a true Virtualization layer, we can enable many of the 5G services on legacy networks such as GSM, UMTS and LTE.

FIG. 3 also shows that both SA (Option 2) and NSA (Option 3/3a/3x) are supported. For example, a UE may be connected both to ng-eNB and gNB using DC (Dual Connectivity). HNG supports DC for a UE that needs to use the 4G EPC, and also supports a UE that needs to use the 5GC, by providing distinguishing signal paths.

End-to-End Network Slicing

In order to support the different type of services, the network resources, all the way from the RAN to the Internet Access, will require the ability to have End-to-End 'slices', each of them with their own performance characteristics, isolated from the other slices. Each slice has a requirement for a different QoS, security considerations, latency characteristics, Inline Services, etc. For example, the network characteristics for a Best Effort IoT slice will differ significantly from a high-end Enterprise slice (think throughput, latency, always-on vs intermittent connection, data volume, voice vs data-only).

Figure 4:
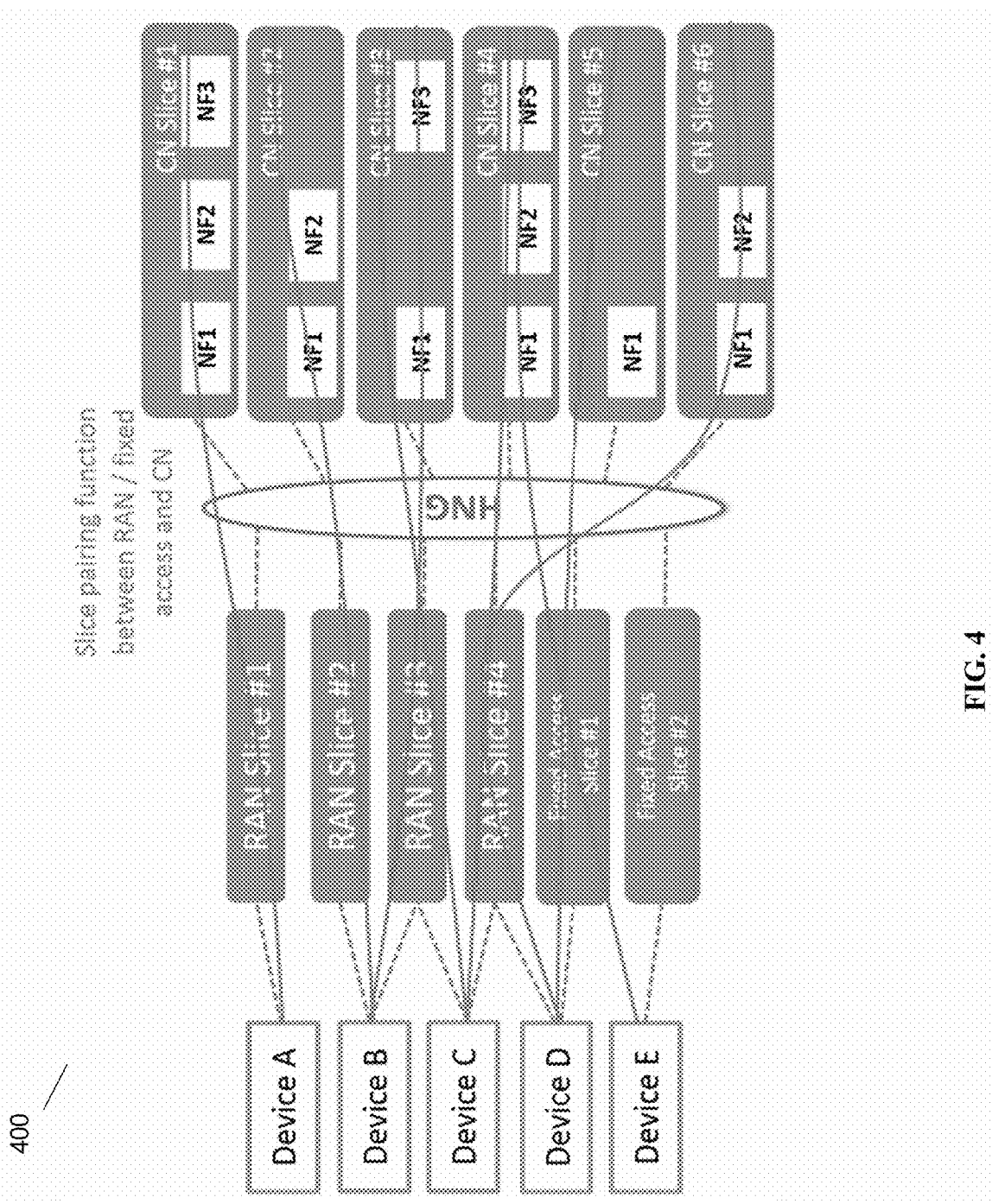
FIG. 4 is a diagram showing a 5G system including an HNG used in network slicing, in accordance with some embodiments.

FIG. 4 shows a system 400 where the HetNet Gateway (HNG) plays a central role in orchestrating the slicing functionality in 4G, and in future, in the 5G networks.

The network slicing functionality contains access network slices, core network slices and the selection function in the HNG that connects these slices into a complete network slice comprised of both the access network and the core network. The selection function routes communications to an appropriate CN slice that is tailored to provide specific services. The criteria of defining the access slices and CN slices include the need to meet different service/applications requirements and to meet different communication requirements.

Each core network slice is built from a set of network functions (NFs). An important factor in slicing is that some NFs can be used across multiple slices, while other NFs are tailored to a specific slice. For example, one slice could be used for enhanced mobile broadband (MBB), and may include NFs such as: video streaming support; MMS support; voice calls and features; service continuity; charging support; data path optimization, etc.; while another slice could be used for IoT, and could have NFs such as: small data optimization; battery conservation; charging support; while another slice could be for an MVNO, with NFs supporting an MVNO feature set and operator-specific charging; etc. The HNG would be able to distinguish between different data streams coming from the UE and pair them to the appropriate slice, including pairing non-5G RATs to the 5G slices. The 5GC could provide slices if available, or could provision and then provide the slices if not available at that time; in some embodiments, an enhanced 5GC could provide other RATs as individual slices (4G as a service, etc.).

5G Core Architecture Overview

The Next Generation Core Network (NGCN) or 5G Core (5GC) is still being specified by 3GPP (Release 15 and beyond). It represents a departure from function-specific with elements like Gateways and Mobility Management Entity, into more granular (micro) services concept.

5GC architecture is influenced by the interfaces and functionalities introduced by 5G New Radio (NR). The NSA and SA options, as well as interfaces between RAN and EPC/NGC, are primarily driven by the RAN component of the new architecture.

Figure 5:
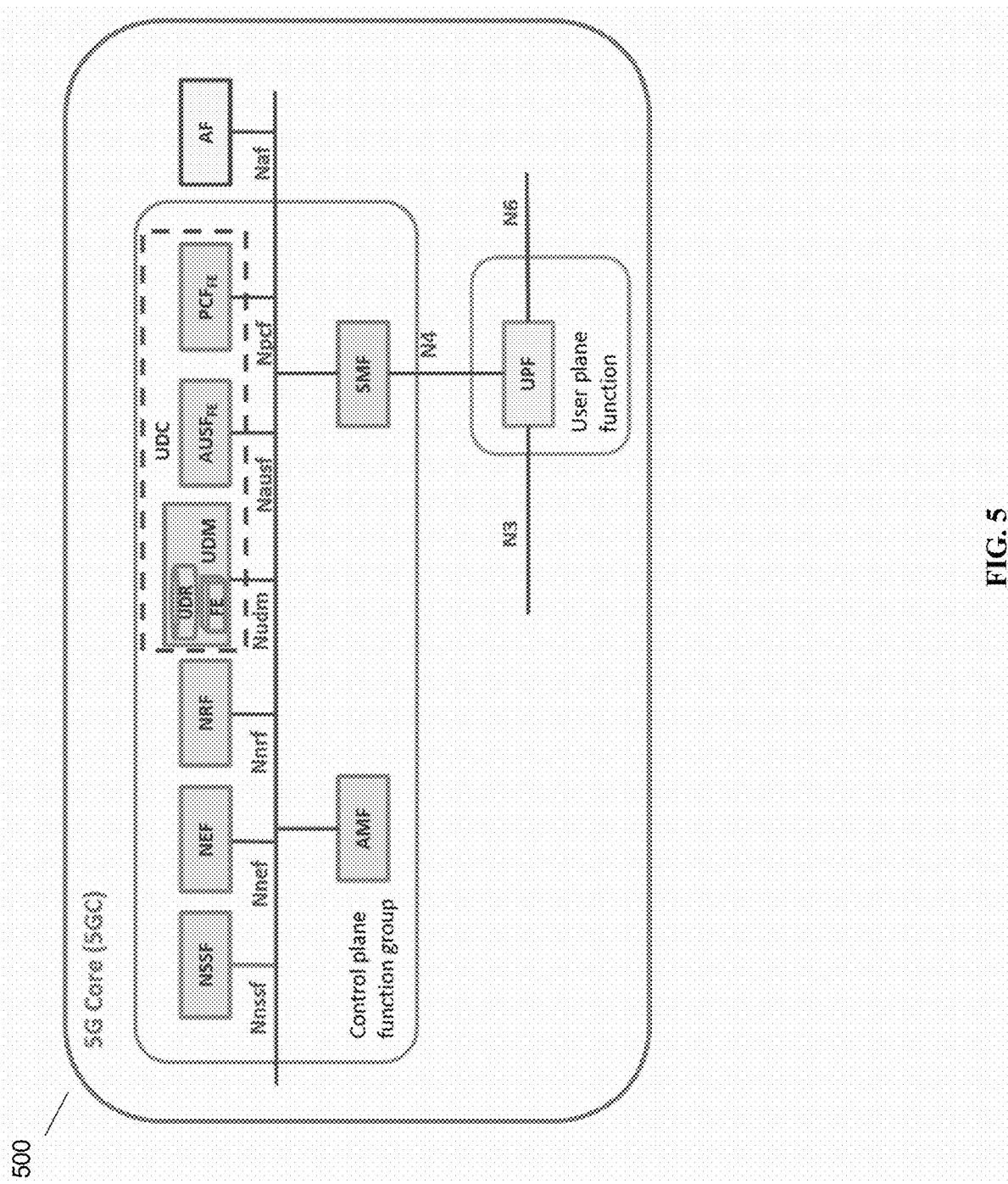
FIG. 5 is a diagram showing a 5G score, in accordance with some embodiments.

Referring now to FIG. 5, a Next Generation Core 500 also introduces the concept of "service bus" for Policy Charging & Control (PCC) as well as subscriber management. Communication across this service bus is accomplished via APIs. Separation of Control and User Planes is a basic requirement of this new architecture. The multiple Access Networks (RAN, WiFi, Fixed Access) includes Licensed and Unlicensed RAN, WiFi Access as well as fixed networks. It is important to note that these multiple access technologies share a common Control Plane, PCC and Subscriber Management component.

The new 5G system is service-based architecture (SBA). This means that wherever suitable the architecture elements are defined as network functions that offer their services via interfaces of a common framework to any network functions that are permitted to make use of these provided services. NRF or Network repository functions allow every network function to discover the services offered by other network functions. This architecture model, which further adopts principles like modularity, reusability and self-containment of network functions, is chosen to enable deployments to take advantage of the latest virtualization and software technologies.

To enable early adopters of 5G technology to launch commercial services with New Radio (NR), the NSA approach allows to use an existing 4G Mobile Core Network and ease the transition to the Next Generation Core (NGC) once it is available.

Multiple-Access/Multiple-Service Networks: In addition to the network supporting both 4G and 5G RAN, the 5G Core Network will have a deeper integration of access technologies like WiFi and Fixed Access. The main vision of 5G core networks is to have common control and user planes regardless of the access type(s) being used. While this requirement adds complexity to the overall solution and its deployment, it grants enormous flexibility for multi-service operators.

End to End Network Slicing: in order to support the different type of services shown above and over a common network, the network resources—all the way from the RAN to the Internet Access-will include the ability to have End-to-End 'slices', each of them with their own performance characteristics, isolated from the other slices. Each slice will have a different QoS, security considerations, latency characteristics, Inline Services, etc. For example, the network characteristics for a Best Effort IoT slice will differ significantly from a high-end Enterprise slice (think throughput, latency, always-on vs intermittent connection, data volume, voice vs data-only)

Fully virtualized Next Generation core (NGC): the transformation on mobile networks initiated with virtualization of the mobile core in 4G (away from chassis/proprietary hardware), has become a pillar of 5G networks. Requirements in this area go beyond the mere use of VM-based Virtual Network Functions (VNF), but as an evolution towards cloud-native architectures. The IT model of deployment (as cloud-giants like Amazon have done for e-commerce) is being applied to the Telecom industry. Automation and Orchestration of such virtualized solutions is a necessity as well. The ability to separate Control and User planes is also a basic requirement of 5G networks.

Figure 6:
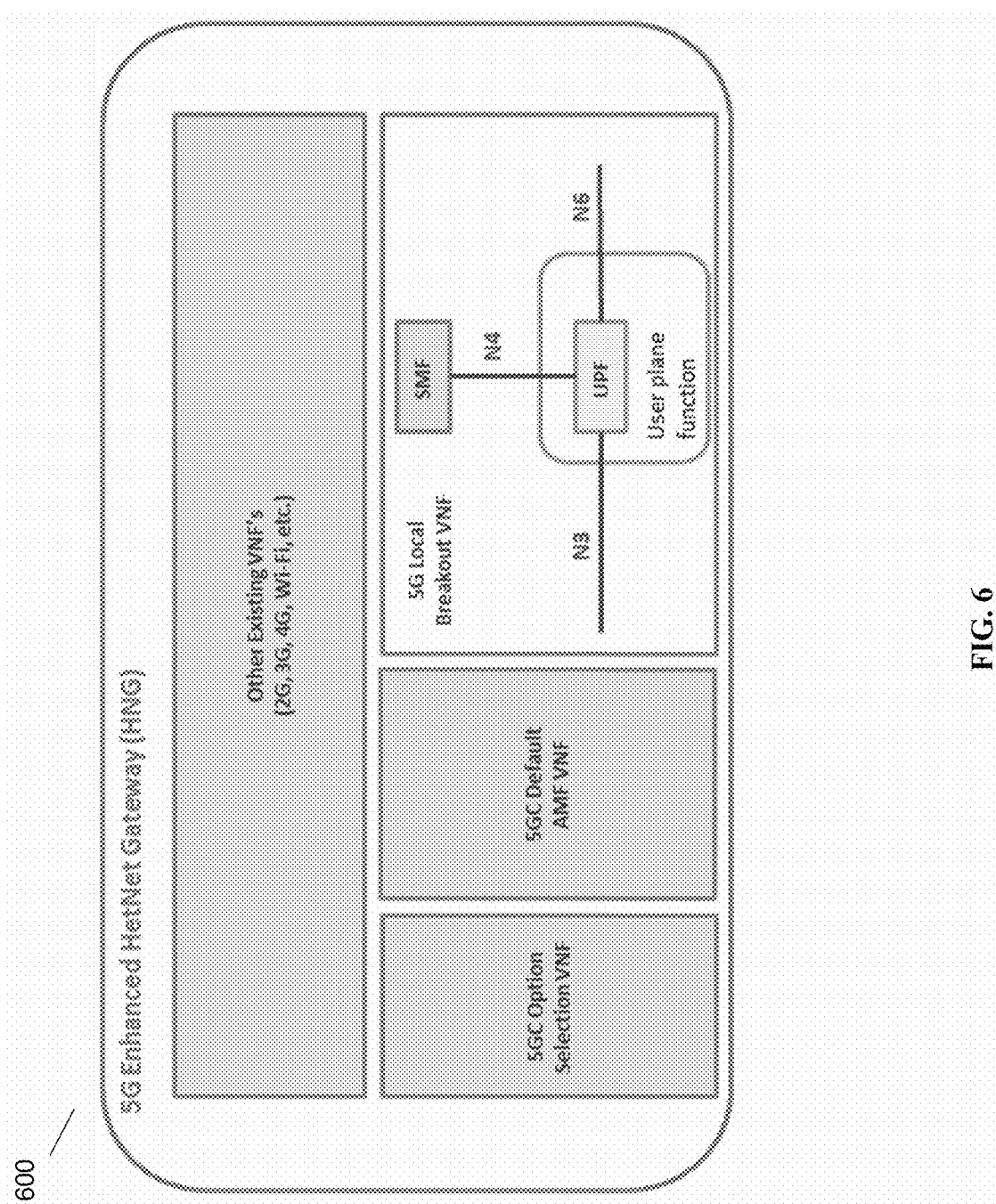
FIG. 6 is a diagram showing a 5G system enhanced HNG, in accordance with some embodiments.

A 5G Enhanced HetNet Gateway (HNG) 800 is shown in FIG. 6. A 5GC option selection VNF, a 5G default AMF VNF, and a 5G local breakout VNF are shown. Crucially, other VNFs may also be present on the enhanced HNG 800, supporting other RATs. The other VNFs may interoperate and intercommunicate with the 5G VNFs, to, for example, provide local breakout for 4G as well as for 5G.

As discussed earlier, HNG will play a key role in the 5G network architecture to simplify the deployment of 5G network and the 5G migration strategy.

The following key functionality is foreseen for HNG with the 5G network: HNG will provide advanced RAN functions thereby simplifying LTE & NR deployments. This includes centralization of RAN functionality to help faster scalability. SON will allow for faster deployment while managing interference between different nodes.

HNG already abstracts core functionality for EPC and will abstract functionality for the 5GC thereby providing distributed core functionality. This will help keep latency down which is a must for URLLC. It will also simplify 5G deployment options for operators. HNG will seamlessly work with all deployment options for 5G.

Figure 7:
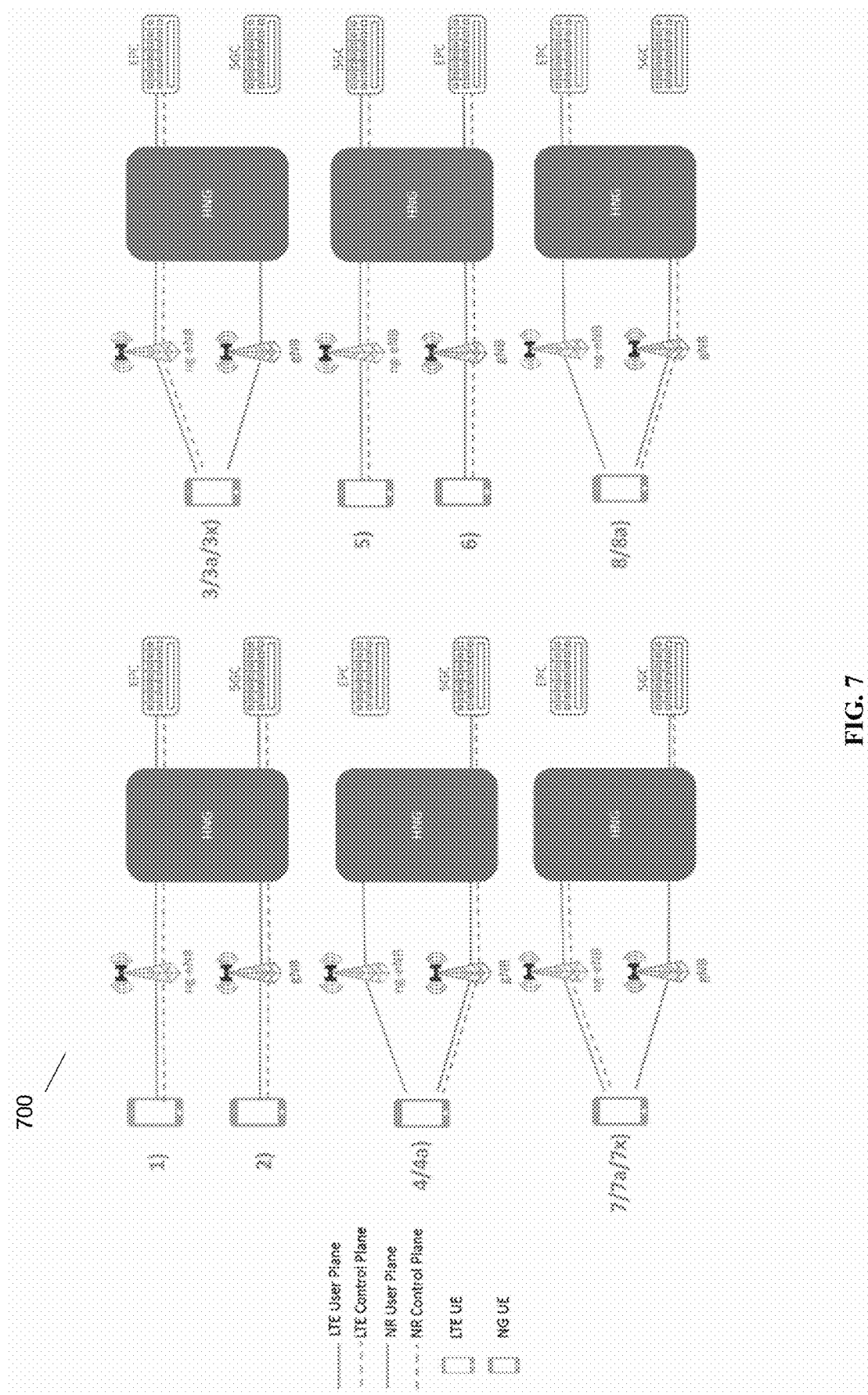
FIG. 7 is a diagram showing an HNG supporting different 5G deployment options, in accordance with some embodiments.

FIG. 7 shows how the HNG is foreseen to support all different 5G deployment options 700.

Figure 8:
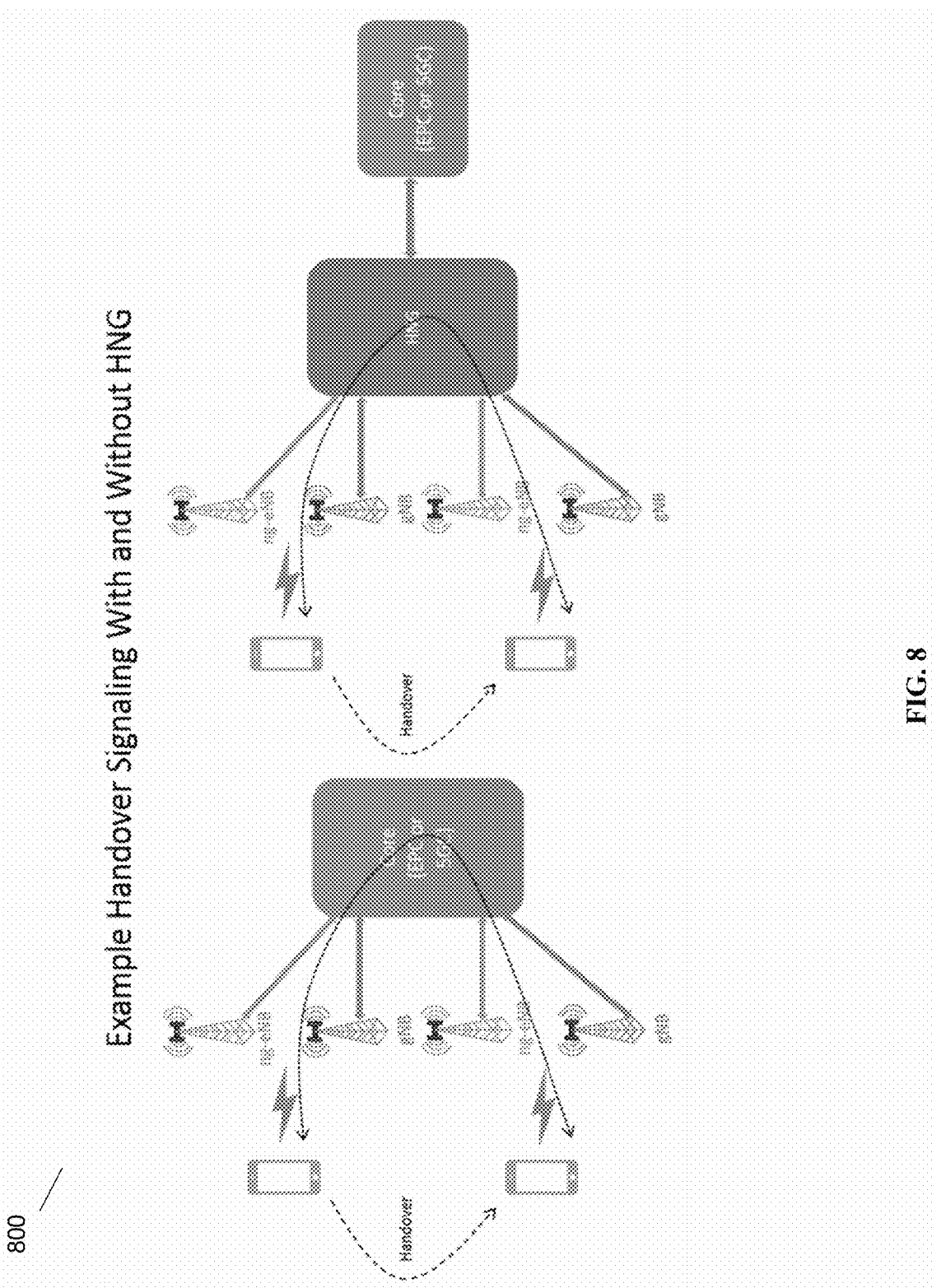
FIG. 8 is a diagram showing handover signaling with and without an HNG, in accordance with some embodiments.

An example 800 of signaling reduction by way of using the new HNG is shown in FIG. 8. HetNet Gateway allows many different types of optimization in the network by absorbing various signaling traffic from the core. This reduces the load on the core as functionality like paging, handovers, etc. is now being handled in the HNG rather than core.

Signaling reduction in the core allows operators to modify various logical groupings of the number of cells in the Tracking Areas (TAs). Increase in Tracking Area size leads to the UEs doing less updates thereby saving power consumption.

Figure 9:
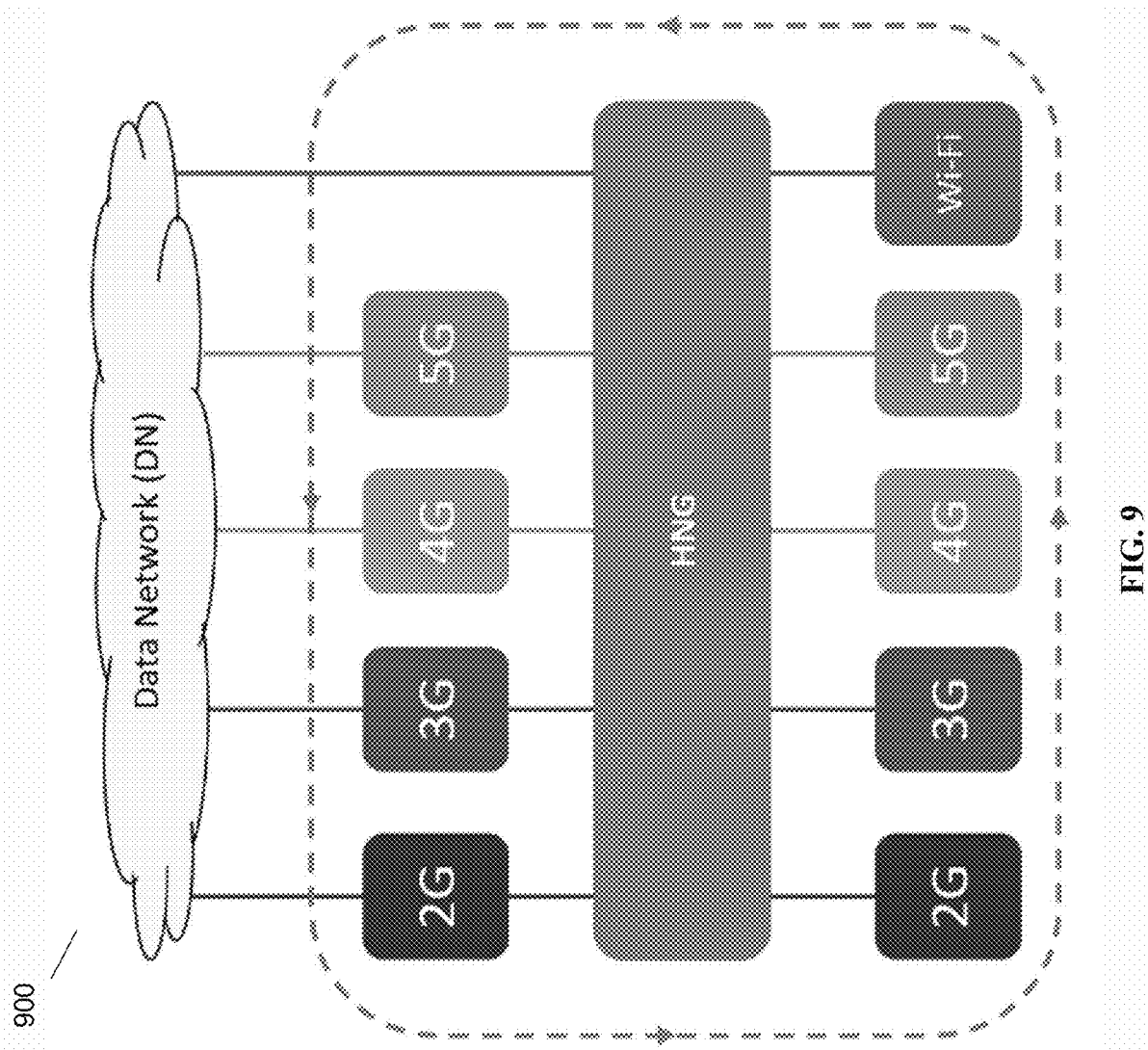
FIG. 9 is a diagram showing a SON system including an HNG, in accordance with some embodiments.

A SON 900 using the HNG is shown in FIG. 9. Parallel Wireless Real-Time Hybrid SON solution works with any-G network and Wi-Fi to optimize the end-user experience. It is the only Hybrid-SON solution which can be integrated with distributed third-party nodes and SON solutions.

Figure 10:
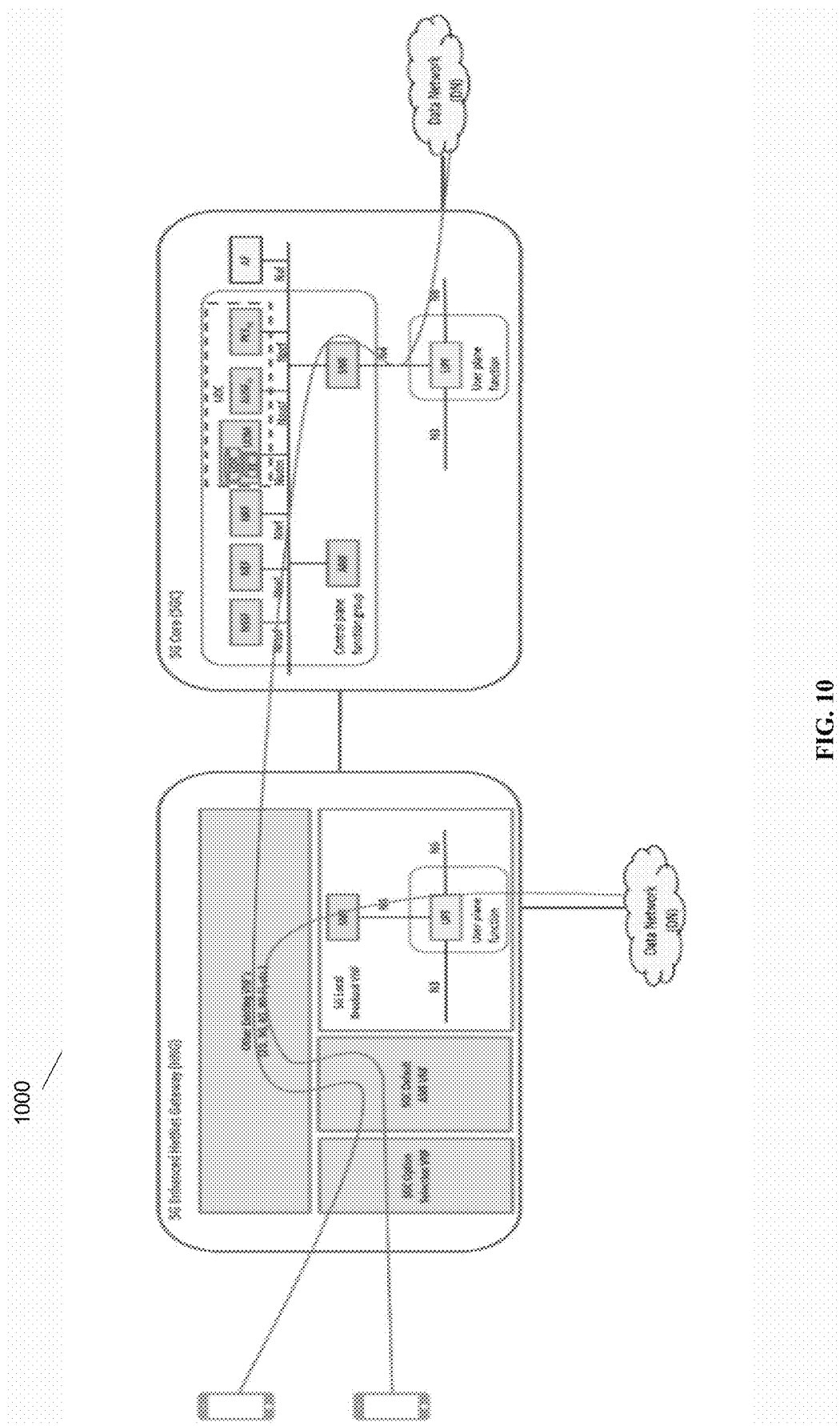
FIG. 10 is a diagram showing a 5G system including an HNG, in accordance with some embodiments.

FIG. 10 shows a system diagram 1000 tying together the 5GC of FIG. 5 with the 5G enhanced HNG of FIG. 6, showing a signal path for two UEs. Here, offload in case of low-latency communications via the 5G Local Breakout VNF is shown. One UE prefers local breakout for lower latency; the other UE prefers to go through the 5GC for greater security or guaranteed throughput. Since other VNFs are also present on the enhanced HNG, the other RATs are also able to take advantage of the offload capability, including transit through 5GC for non-5G RATs, in some embodiments.

As discussed earlier, 5G has three main use-cases:
Enhanced Mobile Broadband (eMBB): This has been billed as the main driver for initial 5G rollouts. Not only are end-users expecting to receive faster speeds, they expect more data allowances for a lower price. 5G meets the end-user expectations while delivering spectral efficiency for the operator. Parallel Wireless HetNet Gateway plays an important role here by abstracting core functionality and catering for different deployment options, based on the SP's roadmap.
Massive Machine Type Communications (mMTC): LTE-M and NB-IoT, standardized as part of 3GPP Release-13 version of LTE is being enhanced to work with 5G. There is no special focus for mMTC in 5G currently but will play an important role in 3GPP Release-16 version of 5G.
Ultra-Reliable and Low-Latency Communications (URLLC): This feature promises to make 5G appealing to many new verticals thereby providing SPs with new source of revenues. There is no focus for URLLC in 5G currently but will play an important role in 3GPP Release-16 version of 5G. This feature also requires 5GC as new slices would need to be created for different verticals to meet their requirements.

In addition to the above use cases, fixed wireless access (FWA) has also emerged as an important use case for quite a few operators. While there are no special features that have been added specifically for FWA, features such as 3D beamforming and wider bandwidths make 5G an attractive option for FWA. Parallel Wireless HetNet Gateway is increasingly being deployed in rural areas to not only provide mobile broadband services but also for fixed wireless deployments using 4G LTE. It is foreseen that this trend will continue once 5G NR is available.

Figure 11:
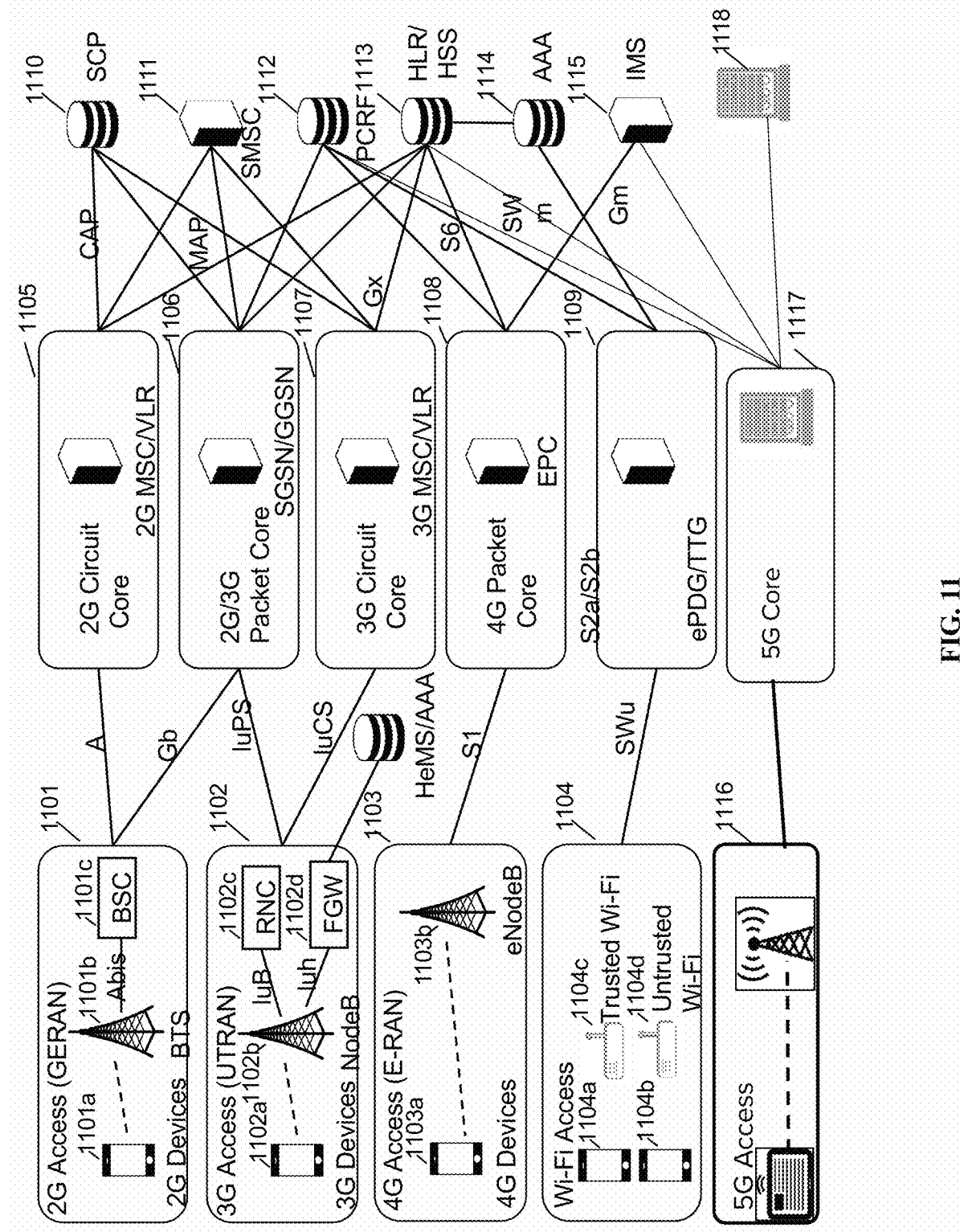
FIG. 11 is a schematic network architecture diagram for 3G and other-G prior art networks.

FIG. 11 is a schematic network architecture diagram for 3G and other-G prior art networks. The diagram shows a plurality of "Gs," including 2G, 3G, 4G, 5G and Wi-Fi. 2G is represented by GERAN 1101, which includes a 2G device 1101*a*, BTS 1101*b*, and BSC 1101*c*. 3G is represented by UTRAN 1102, which includes a 3G UE 1102*a*, nodeB 1102*b*, RNC 1102*c*, and femto gateway (FGW, which in 3GPP namespace is also known as a Home nodeB Gateway or HNBGW) 1102*d*. 4G is represented by EUTRAN or E-RAN 1103, which includes an LTE UE 1103*a* and LTE eNodeB 1103*b*. Wi-Fi is represented by Wi-Fi access network 1104, which includes a trusted Wi-Fi access point 1104*c* and an untrusted Wi-Fi access point 1104*d*. The Wi-Fi devices 1104*a* and 1104*b* may access either AP 1104*c* or 1104*d*. In the current network architecture, each "G" has a core network. 2G circuit core network 1105 includes a 2G MSC/VLR; 2G/3G packet core network 1106 includes an SGSN/GGSN (for EDGE or UMTS packet traffic); 3G circuit core 1107 includes a 3G MSC/VLR; 4G circuit core 1108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 1130, the SMSC 1131, PCRF 1132, HLR/HSS 1133, Authentication, Authorization, and Accounting server (AAA) 1134, and IP Multimedia Subsystem (IMS) 1135. An HeMS/AAA 1136 is present in some cases for use by the 3G UTRAN. The diagram is used to indicate schematically the basic functions of each network as known to one of skill in the art, and is not intended to be exhaustive. For example, 5G core 1117 is shown using a single interface to 5G access 1116, although in some cases 5G access can be supported using dual connectivity or via a non-standalone deployment architecture.

Noteworthy is that the RANs 1101, 1102, 1103, 1104 and 1136 rely on specialized core networks 1105, 1106, 1107, 1108, 1109, 1137 but share essential management databases 1130, 1131, 1132, 1133, 1134, 1135, 1138. More specifically, for the 2G GERAN, a BSC 1101*c* is required for Abis compatibility with BTS 1101*b*, while for the 3G UTRAN, an RNC 1102*c* is required for Iub compatibility and an FGW 1102*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 12:
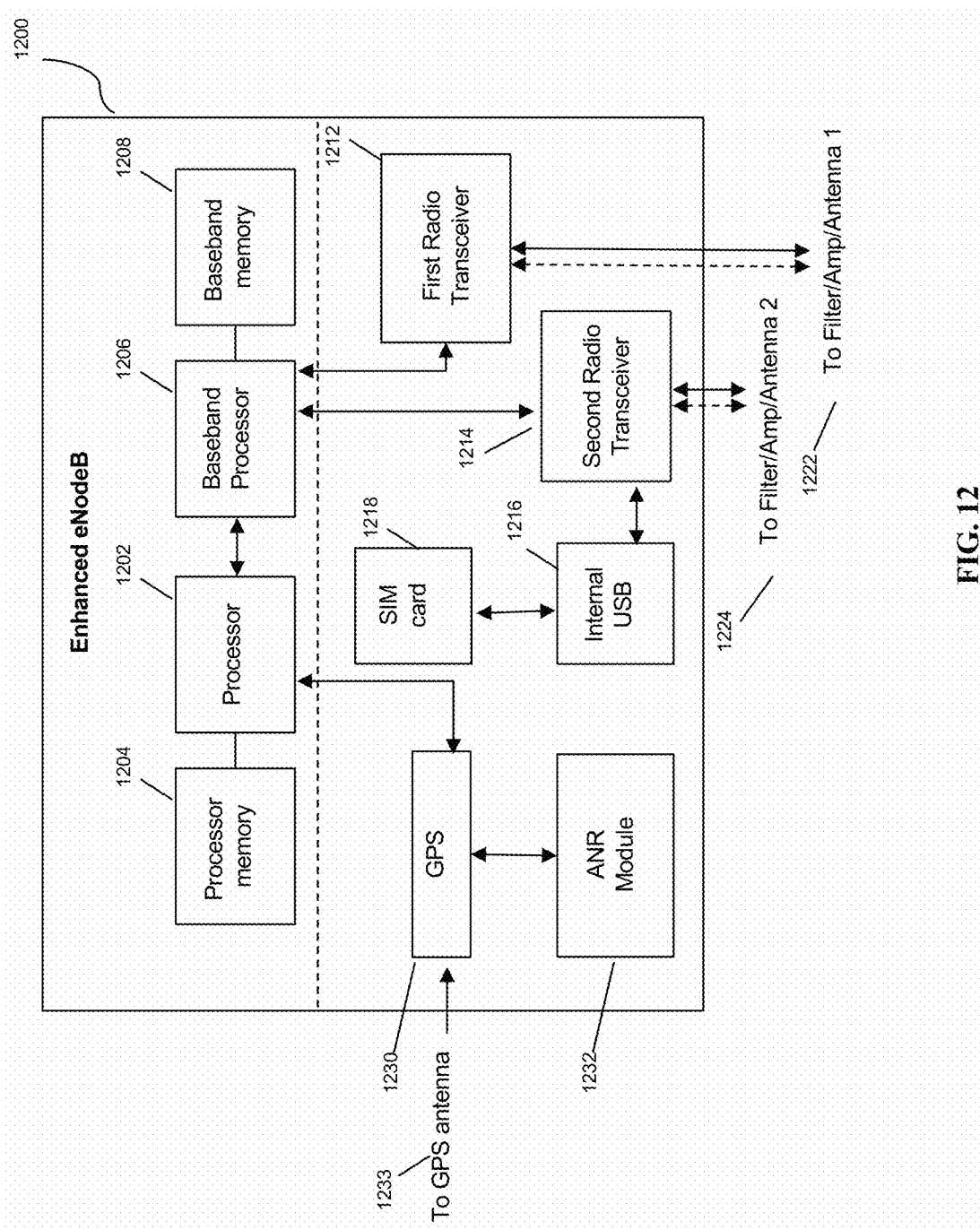
FIG. 12 is diagram of an enhanced eNodeB for performing the methods described herein, in accordance with some embodiments.

FIG. 12 shows an enhanced eNodeB for performing the methods described herein, in accordance with some embodiments. eNodeB 1200 may include processor 1202, processor memory 1204 in communication with the processor, baseband processor 1206, and baseband processor memory 1208 in communication with the baseband processor. Mesh network node 1200 may also include first radio transceiver 1212 and second radio transceiver 1214, internal universal serial bus (USB) port 1216, and subscriber information module card (SIM card) 1218 coupled to USB port 1216. In some embodiments, the second radio transceiver 1214 itself may be coupled to USB port 1216, and communications from the baseband processor may be passed through USB port 1216. The second radio transceiver may be used for wirelessly backhauling eNodeB 1200.

Processor 1202 and baseband processor 1206 are in communication with one another. Processor 1202 may perform routing functions, and may determine if/when a switch in network configuration is needed. Baseband processor 1206 may generate and receive radio signals for both radio transceivers 1212 and 1214, based on instructions from processor 1202. In some embodiments, processors 1202 and 1206 may be on the same physical logic board. In other embodiments, they may be on separate logic boards.

Processor 1202 may identify the appropriate network configuration, and may perform routing of packets from one network interface to another accordingly. Processor 1202 may use memory 1204, in particular to store a routing table to be used for routing packets. Baseband processor 1206 may perform operations to generate the radio frequency signals for transmission or retransmission by both transceivers 1210 and 1212. Baseband processor 1206 may also perform operations to decode signals received by transceivers 1212 and 1214. Baseband processor 1206 may use memory 1208 to perform these tasks.

The first radio transceiver 1212 may be a radio transceiver capable of providing LTE eNodeB functionality, and may be capable of higher power and multi-channel OFDMA. The second radio transceiver 1214 may be a radio transceiver capable of providing LTE UE functionality. Both transceivers 1212 and 1214 may be capable of receiving and transmitting on one or more LTE bands. In some embodiments, either or both of transceivers 1212 and 1214 may be capable of providing both LTE eNodeB and LTE UE functionality. Transceiver 1212 may be coupled to processor 1202 via a Peripheral Component Interconnect-Express (PCI-E) bus, and/or via a daughtercard. As transceiver 1214 is for providing LTE UE functionality, in effect emulating a user equipment, it may be connected via the same or different PCI-E bus, or by a USB bus, and may also be coupled to SIM card 1218. First transceiver 1212 may be coupled to first radio frequency (RF) chain (filter, amplifier, antenna) 1222, and second transceiver 1214 may be coupled to second RF chain (filter, amplifier, antenna) 1224.

SIM card 1218 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1200 is not an ordinary UE but instead is a special UE for providing backhaul to device 1200.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1212 and 1214, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1202 for reconfiguration.

A GPS module 1230 may also be included, and may be in communication with a GPS antenna 1232 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1232 may also be present and may run on processor 1202 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 13:
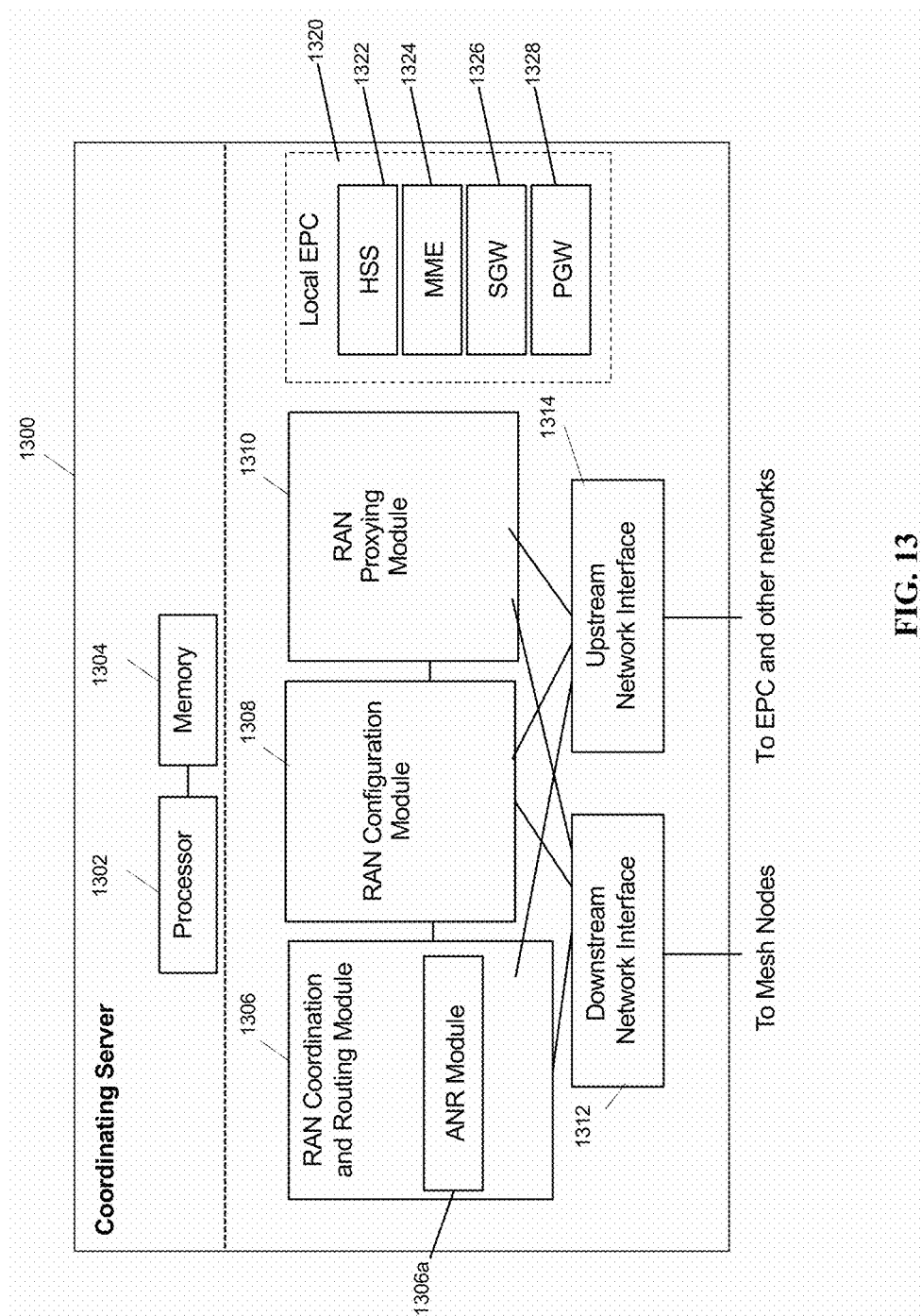
FIG. 13 is a diagram of is a coordinating server for providing services and performing methods as described herein, in accordance with some embodiments.

FIG. 13 is a coordinating server for providing services and performing methods as described herein, in accordance with some embodiments. Coordinating server 1300 includes processor 1302 and memory 1304, which are configured to provide the functions described herein. Also present are radio access network coordination/routing (RAN Coordination and routing) module 1306, including ANR module 1306a, RAN configuration module 1308, and RAN proxying module 1310. The ANR module 1306a may perform the ANR tracking, PCI disambiguation, ECGI requesting, and GPS coalescing and tracking as described herein, in coordination with RAN coordination module 1306 (e.g., for requesting ECGIs, etc.). In some embodiments, coordinating server 1300 may coordinate multiple RANs using coordination module 1306. In some embodiments, coordination server may also provide proxying, routing virtualization and RAN virtualization, via modules 1310 and 1308. In some embodiments, a downstream network interface 1312 is provided for interfacing with the RANs, which may be a radio interface (e.g., LTE), and an upstream network interface 1314 is provided for interfacing with the core network, which may be either a radio interface (e.g., LTE) or a wired interface (e.g., Ethernet).

Coordinator 1300 includes local evolved packet core (EPC) module 1320, for authenticating users, storing and caching priority profile information, and performing other EPC-dependent functions when no backhaul link is available. Local EPC 1320 may include local HSS 1322, local MME 1324, local SGW 1326, and local PGW 1328, as well as other modules. Local EPC 1320 may incorporate these modules as software modules, processes, or containers. Local EPC 1320 may alternatively incorporate these modules as a small number of monolithic software processes. Modules 1306, 1308, 1310 and local EPC 1320 may each run on processor 1302 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G standard or the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 5G technology is described, the inventors have understood that other RATs have similar equivalents, such as a gNodeB and eNB in 4G. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A 5G network node, comprising:
    at least one non-5G virtual network function (VNF) providing 2G, 3G, 4G, or Wi-Fi core network functionality;
    a 5G Core (5GC) option selection VNF providing selection of an access network slice and a core network slice;
    a 5GC access and mobility management function (AMF) VNF;
    a 5G local breakout VNF;
    at least one interface for an any G base station; and
    at least one interface for a 4G Long Term Evolution core network, which is an Evolved Packet Core (EPC),
    wherein core functionality is abstracted for the any G base station and for the 5GC by interworking the 5GC to the any G base station, and wherein signaling traffic is internally processed by the network node to reduce load on at least one communicatively coupled core network.

2. The 5G network node of claim 1 wherein the non-5G VNF comprises at least one of a 2G core VNF, a 3G core VNF, a 4G core VNF and a Wi-Fi core VNF.

3. The 5G network node of claim 1 wherein the any G base station comprises at least one of an eNodeB and a gNodeB.

4. The 5G network node of claim 1 wherein advanced RAN functions are supported for simplifying LTE and NR deployments.

5. The 5G network node of claim 1 wherein signaling traffic processing for a core results from reduction of signaling traffic for paging and handovers.

6. The 5G network node of claim 5 wherein signaling traffic reduction for a core allows modification of logical groupings of a number of cells in a Tracking Area (TA).

7. A system comprising:
    a 5G Non-Stand-Alone (NSA) base station;
    a 5G enhanced network node in communication with the NSA base station;
    a core network in communication with the 5G enhanced network node, the core network including at least one of an Evolved Packet Core (EPC) and a 5G Core (5GC); and
    wherein the 5G enhanced network node abstracts core functionality for at least one of the EPC and the 5GC by virtualizing and interworking the at least one of the EPC and the 5GC to the 5G NSA base station, and
    wherein signaling traffic from a core is internally processed by the network node to reduce load on the core.

8. The system of claim 7 wherein the enhanced network node comprises:
    at least one non-5G virtual network function (VNF);
    a 5G Core (5GC) option selection VNF;
    a 5GC access and mobility management function (AMF) VNF;
    a 5G local breakout VNF;
    at least one interface for an any G base station; and
    at least one interface for any core network.

9. A method of operating a 5G network node, comprising:
    providing at least one non-5G virtual network function (VNF) for providing 2G, 3G, 4G, or Wi-Fi core network functionality;
    providing a 5G Core (5GC) option selection VNF;
    providing a 5GC access and mobility management function (AMF) VNF;
    a 5G local breakout VNF;
    providing at least one interface for an any G base station;
    providing at least one interface for a 4G Evolved Packet Core (EPC); and
    virtualizing and interworking the EPC to the base station, and
    internally processing signaling traffic from a core to reduce load on the core.

10. The method of claim 9 wherein the providing a non-5G VNG comprises providing at least one of a 2G VNF, a 3G VNF, a 4G VNF and a WiFi VNF.

11. The method of claim 9 wherein the providing any G base station comprises providing at least one of an eNodeB and a gNodeB.

12. The method of claim 9 wherein providing advanced RAN functions are supported for simplifying LTE and NR deployments.

13. The method of claim 9 wherein signaling traffic processing for a core results from reduction of signaling traffic for paging and handovers.

14. The method of claim 13 wherein signaling traffic reduction for a core allows modification of logical groupings of a number of cells in a Tracking Area (TA).

* * * * *